(12) United States Patent
Kohashi et al.

(10) Patent No.: US 6,341,141 B1
(45) Date of Patent: Jan. 22, 2002

(54) METHOD AND APPARATUS FOR DETECTING SPECTRUM SPREAD SIGNALS

(75) Inventors: Takashi Kohashi; Akira Ogino; Hisayoshi Moriwaki, all of Tokyo; Yuji Kimura, Kanagawa; Nozomu Ikeda, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/143,386

(22) Filed: Aug. 28, 1998

(30) Foreign Application Priority Data

Sep. 1, 1997 (JP) .......................................... 09-235786
Sep. 2, 1997 (JP) .......................................... 09-237276

(51) Int. Cl.[7] ............................................... H04L 27/30
(52) U.S. Cl. ...................... 375/137; 375/145; 375/149; 375/345
(58) Field of Search ................................ 375/130, 137, 375/145, 149, 345

(56) References Cited

U.S. PATENT DOCUMENTS 5,315,448 A * 5/1994 Ryan ........................... 360/60
5,486,930 A * 1/1996 Iketani et al. ............... 358/335
5,719,937 A * 2/1998 Warren et al. ................ 380/4
5,739,864 A * 4/1998 Copeland ..................... 348/473
5,940,429 A * 8/1999 Lam et al. .................... 375/200
6,163,565 A * 12/2000 Moriwaki et al. ........... 375/141

* cited by examiner

*Primary Examiner*—Stephen Chin
*Assistant Examiner*—Dac V. Ha
(74) *Attorney, Agent, or Firm*—Jay H. Maioli

(57) ABSTRACT

A method and apparatus for detecting spectrum spread signals by reducing the correlation between the main information signal and the spread signal as much as possible, whereby the detection of a spectrum spread signal is made easier. From an input signal, in which a spectrum spread signal obtained by spectrum spreading an additional information signal has been superimposed on a main information signal, the spectrum spread signal is detected. Using a level adjusting circuit, the gain of the input signal, mainly the main information signal is controlled to reduce the change in the main information signal, or the input signal is sliced at a predetermined level by a slicing circuit to fetch a signal at a predetermined level or lower. A spectrum spread signal detecting unit performs an inverse spectrum spread on an input signal in which the change in the main information signal is reduced, or an input signal with the major portion of the main information signal removed to thereby detect the additional information spectrum spread signal.

12 Claims, 16 Drawing Sheets

SPECTRUM OF INFORMATION SIGNAL ON WHICH SS ADDITIONAL INFORMATION IS SUPERIMPOSED

SIGNAL SPECTRUM AFTER INVERSE SPECTRUM SPREAD ON A RECORDING APPARATUS SIDE

F I G. 1
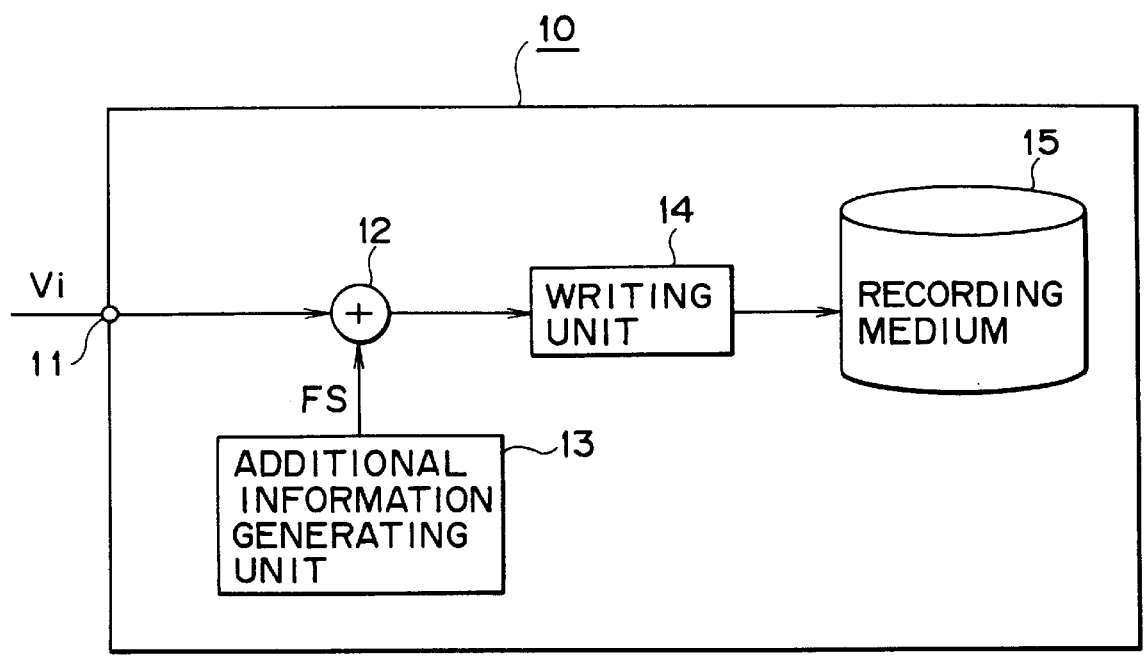

ADDITIONAL INFORMATION SPECTRUM
BEFORE SPECTRUM SPREAD

ADDITIONAL INFORMATION SPECTRUM
AFTER SPECTRUM SPREAD

SPECTRUM OF INFORMATION SIGNAL ON WHICH
SS ADDITIONAL INFORMATION IS SUPERIMPOSED

SIGNAL SPECTRUM AFTER INVERSE SPECTRUM
SPREAD ON A RECORDING APPARATUS SIDE

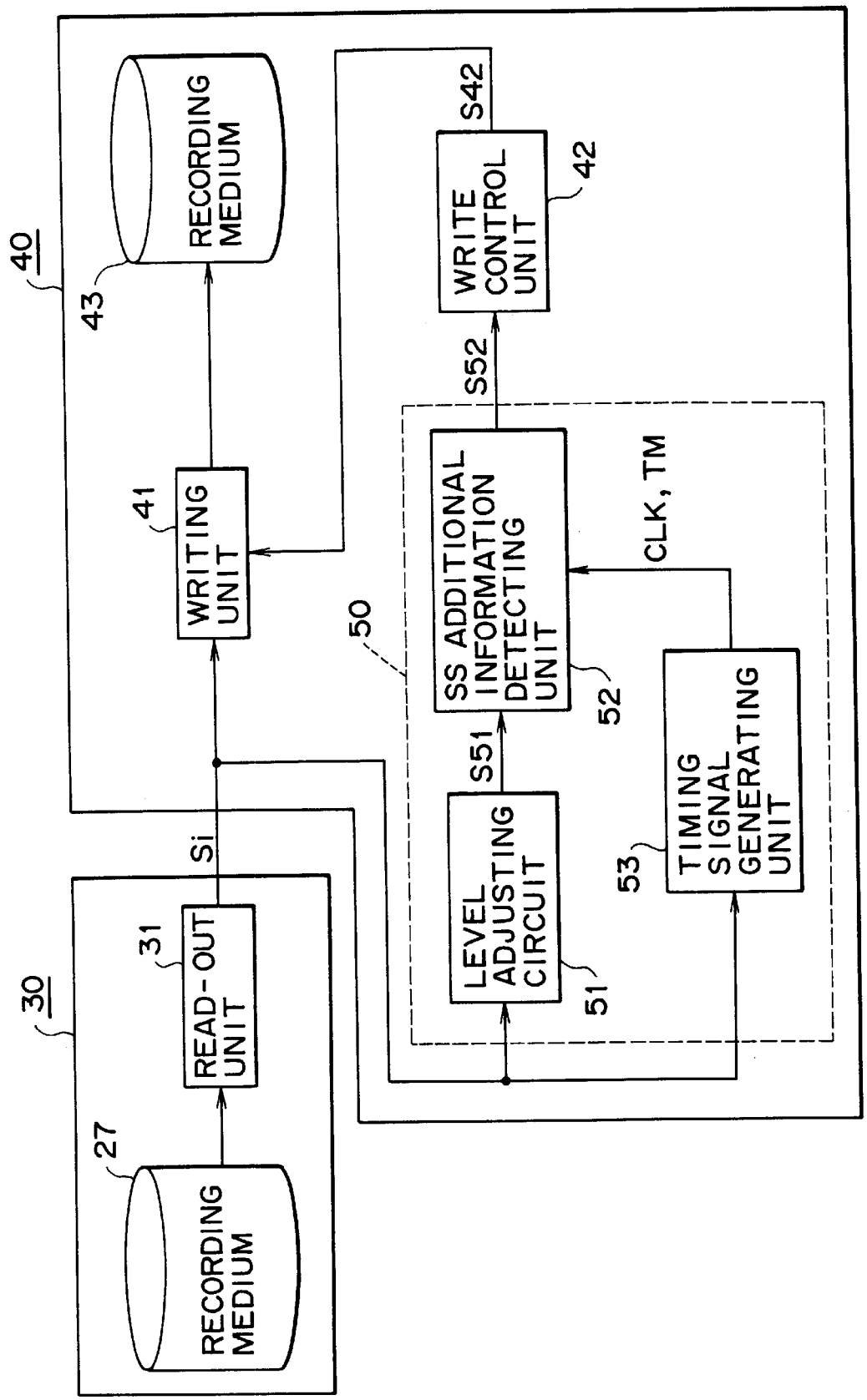

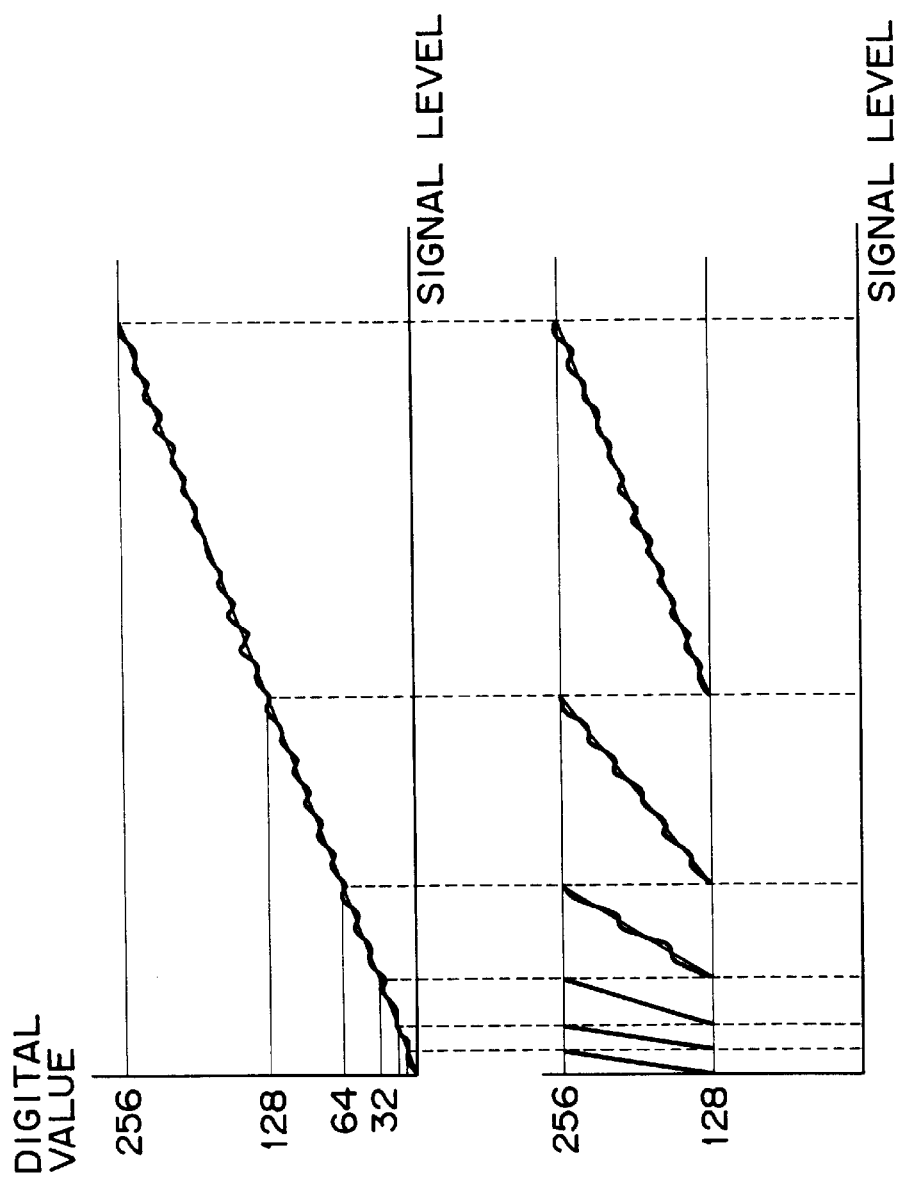
F I G. 14A
F I G. 14B

F I G. 17
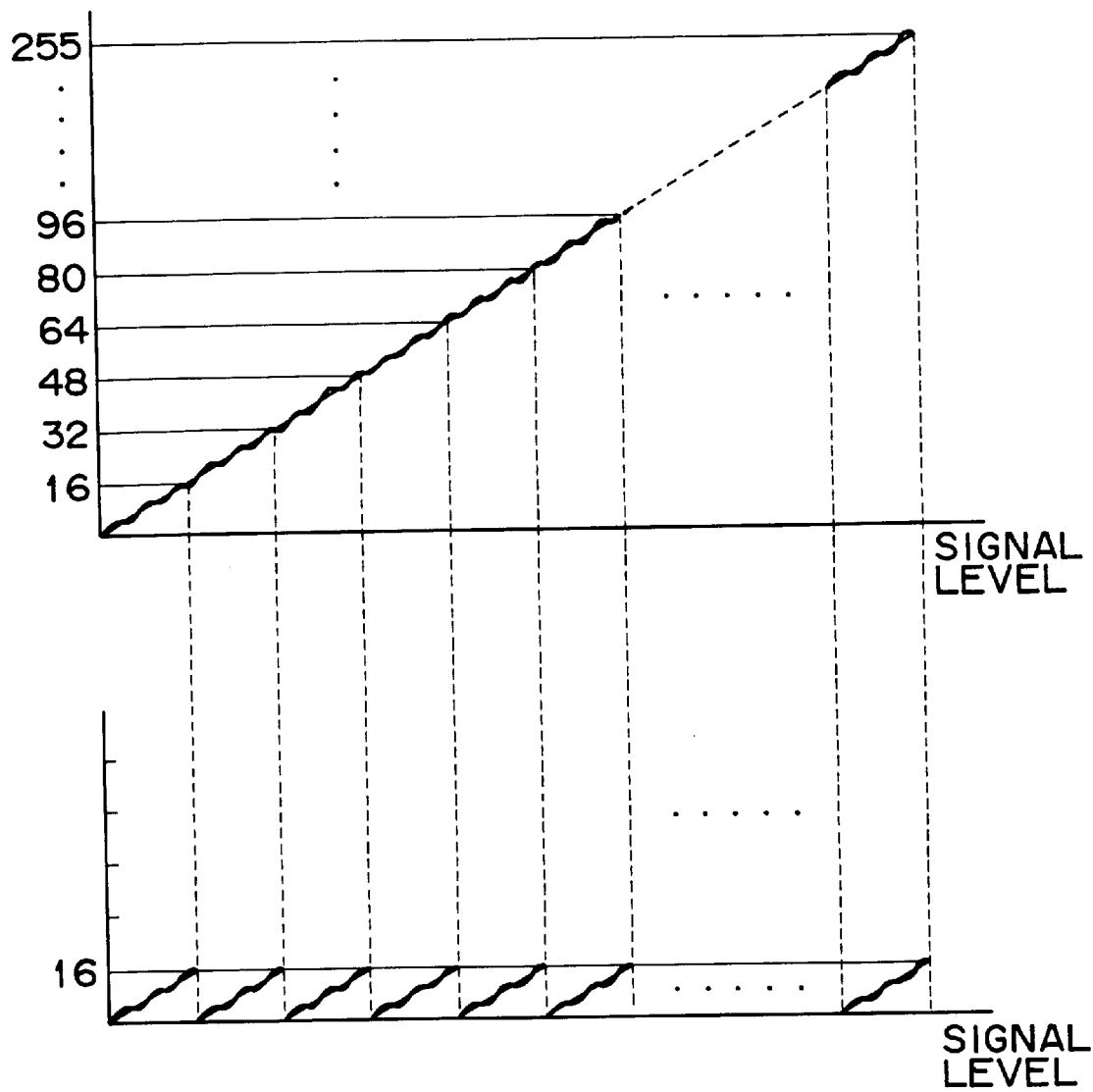

METHOD AND APPARATUS FOR DETECTING SPECTRUM SPREAD SIGNALS

FIELD OF THE INVENTION

The present invention relates to a method and an apparatus for detecting a spectrum spread signal in additional information signal which has been spectrum spread and superimposed on a main information signal such as, for example, a video signal.

BACKGROUND OF THE INVENTION

Digital information recording apparatuses such as digital VTRs and MD (Minidisc) recording and playback apparatuses have become widespread, and further DVD (Digital Video Disc or Digital Versatile Disc) apparatuses each equipped with a recording function have also come on the market. In these digital information recording apparatuses, various additional information signals are allowed to be recorded in the wake of digital video signals, digital audio signals and further data for computers and the like, which are main information signals.

FIG. 1 is a view showing a structural example of a conventional recording apparatus adapted to add an additional information signal onto a digital information signal for recording. In the recording apparatus of the example of FIG. 1, a digital information signal Vi is supplied to a recording apparatus 10 through an input terminal 11. In this recording apparatus 10, an additional information signal is added onto the digital information signal Vi to be recorded on a recording medium 15.

In an addition unit 12 of the recording apparatus 10, an additional information signal from an additional information generating unit 13 is added to the digital information signal Vi. In this case, this additional information signal is a digital signal, and is added to a digital information signal Vi as a signal to be recorded in such an area as is regionally distinguished from the digital information signal, such as a header portion to be added to data of, for example, a digital information signal in units of blocks, and an area for other TOC (Table of Contents).

A digital information signal, to which an additional information signal from the addition unit 12 is added, is recorded on a recording medium 15 such as tape or a disc by a writing unit 14. In this case, if compression encoding is required for the digital information signal as described above, the compression encoding process is performed in the writing unit 14.

As described above, in the case of a conventional recording system for an additional information signal, the additional information signal is not directly superimposed on a digital information signal, but is arranged to be added to an indirect portion such as a header portion. For this reason, the additional information signal is comparatively easily removed by filtering or tampering, thus possibly making it impossible to detect through a necessary additional information signal by a recording apparatus or a playback apparatus. Particularly, if control information to prevent unauthorized duplication, copyright information or the like is added as an additional information signal, such loss of the additional information signal will bring about such a state that the initial object cannot be achieved.

Also, in the case of addition of an additional information signal onto such an indirect portion as described above, the additional information signal will be lost when the digital information signal is converted into an analog signal because only the main information signal can be obtained. Even if a duplication-preventive control signal is superimposed as an additional information signal, and such a measure as to prevent unauthorized duplication of a digital information signal is taken, the duplication-preventive measure is not effective any longer when converted into an analog signal.

As a superimposition system for an additional information signal capable of solving the problem on the lost additional information signal and the problem when the additional information signal is converted into an analog signal as described above, the present applicant previously proposed a system for spectrum spreading an additional information signal such as the duplication-preventive control signal, and superimposing this additional information signal thus spectrum spread on a video signal to digital-record or analog-record the video signal (U.S. patent application Ser. No. 08/75510).

In this system, a code (hereinafter, referred to as PN code) of PN (Pseudorandom Noise) series, which is used as a spread code, is caused to be generated at a sufficiently high rate, and this code is spectrum spread by applying it to the additional information signal, whereby an additional information signal such as a narrow band duplication-preventive control signal at a high level is caused to be converted into a wide band signal at an infinitesimal level which does not affect the video signaloraudio signal. Thus, this additional information signal thus spectrum spread, that is, the spectrum spread signal is superimposed on the analog video signal to record on a recording medium. In this case, a video signal to be recorded on the recording medium may be either analog or digital.

In this system, the additional information signal such as the duplication-preventive control signal is spectrum spread and superimposed on a video signal as a wide band signal at an infinitesimal level, and therefore, it is difficult, for, for example, a person who intends to duplicate illegally to remove the duplication-preventive control signal superimposed from the video signal.

On the other hand, it is possible to utilize by detecting an additional information signal such as the duplication-preventive control signal superimposed by an inverse spectrum spread. Therefore, it is possible to reliably supply the duplication-preventive control signal together with, for example, the video signal to a recording apparatus side, and on the side of this recording apparatus, it is also possible to detect this duplication-preventive control signal for reliably performing duplication control corresponding to the duplication-preventive control signal detected.

In the case of spectrum spreading an additional information signal to superimpose it on a main information signal such as a video signal, the spectrum spread signal is not removed from the main information signal at the playback of the main information signal, and therefore, it is necessary to superimpose the spectrum spread signal at an infinitesimal level, at which the playback output of the main information signal is not affected.

When, however, the spectrum spread signal is superimposed on the main information signal at such an infinitesimal level, it is important that the spectrum spread signal can be reliably detected from the main information signal.

When the spectrum spread signal is detected from a signal Si in which the spectrum spread signal is superimposed on the main information signal, the evaluation function φ at the time of the inverse spectrum spread is given by the following equation:

$$\phi = \sum Si \cdot pi \quad (1)$$
$$= \sum (Vi + ki \cdot pi) pi$$
$$= \sum Vi \cdot pi + \sum ki \cdot pi \cdot pi$$

where Vi indicates the main information signal such as a video signal, pi, a spread code such as PN code, and ki, the coefficient respectively.

In this equation (1), the first term represents a correlation between the main information signal and the spread signal, and the second term represents a correlation between the spectrum spread signal and the spread code. From this equation (1), it can be seen that the spectrum spread signal could be easily detected if there is no correlation between the main information signal and the spread signal.

Actually, however, the main information signal such as a video signal is correlated with the spread signal. More specifically, if it was a flat signal which has no variations, the main information signal would not be correlated with the spread code, but since a general main information signal varies depending on the content of the information, it cannot be said that it is not correlated with the PN code.

For this reason, it is likely to be difficult to detect the spectrum spread signal obtained by spectrum spreading the additional information signal because of this correlation between the main information signal and the spread signal depending on the content of the information of the main information signal.

In light of the above-described problems, it is an object of the present invention to provide a method and an apparatus capable of reliably detecting the spectrum spread signal by lowering or suppressing the correlation between the main information signal and the spread signal.

SUMMARY OF THE INVENTION

The present invention concerns a method and an apparatus for detecting an additional information signal from an input signal produced by superimposing a spectrum spread, which has been generated by spectrum spreading an additional information signal, on a main information signal, and is characterized in that a change in level of the main information signal contained in the input signal is restrained to generate a level restraining signal, and the level restraining signal is inverse spectrum spread to detect the additional information signal from the input signal. The change in level of the main information signal is restrained by restraining the gain of the input signal by a gain control circuit or slicing the input signal at a predetermined level by a slicing circuit.

Thus, the main information signal in the input signal becomes less correlated with the spread code because it becomes a signal which hardly varies by gain control, or its major portion is removed by slicing. Therefore, it becomes easier to detect the additional information signal spectrum spread.

BRIEF DESCRIPTION OF THE DRAWINGS

FIG. 1 is view showing a conventional example in which an additional information is added to the main information signal;

FIG. 8 is a block diagram showing an example of a system to which an embodiment of a spectrum spread signal detecting apparatus according to the present invention is applied;

FIGS. 14A and 14B are explanatory views illustrating the operation in the embodiment of FIG. 12;

FIG. 17 is an explanatory view illustrating the operation in third embodiment of a level adjusting circuit according to the embodiment of FIG. 8;

DETAILED DESCRIPTION OF PREFERRED EMBODIMENTS

Hereinafter, with reference to the accompanying drawings, the description will be made of embodiments of a method and an apparatus for detecting a spectrum spread signal according to the present invention. The embodiment to be described below is a case where the main information signal is a digital video signal, and there is detected a spectrum spread signal obtained by spectrum spreading an additional information signal to, for example, a duplication-preventive control signal, which has been superimposed and added on this digital video signal. Also, in this embodiment, the video signal, on which the spectrum spread signal has been superimposed, is recorded on a recording medium, for example, a DVD disc. A case where the video signal, to which a spectrum spread signal has been added, is played back from this DVD disc to record (duplicate) it on another unrecorded DVD disc unrecorded will be described.

First, before describing the embodiment according to the present invention, recording of a video signal on which a spectrum spread signal onto the recording medium has been superimposed will be described.

In this respect, in the following embodiment, a spectrum spread signal is superimposed on a luminance signal Y in the video signal, and is not superimposed on a color signal C. It is of course possible to superimpose the spectrum spread signal also on a color signal C. Since, however, on transmitting a color signal in the video signal, two phase axis components of, for example, color-difference signals or the like are used to reproduce the color through the phases of these two axes, the hue is changed even at an infinitesimal level, when the spectrum spread signal is superimposed on the color signal. Therefore, the color becomes comparatively conspicuous, and it is difficult to superimpose the spectrum spread signal without affecting the change in hue. For this reason, in this embodiment, the spectrum spread signal shall be superimposed only on the luminance signal. For the sake of brevity of description, however, an expression of "video signal" will be used without discriminating the luminance signal Y from the color signal C in the following description.

Figure 2:
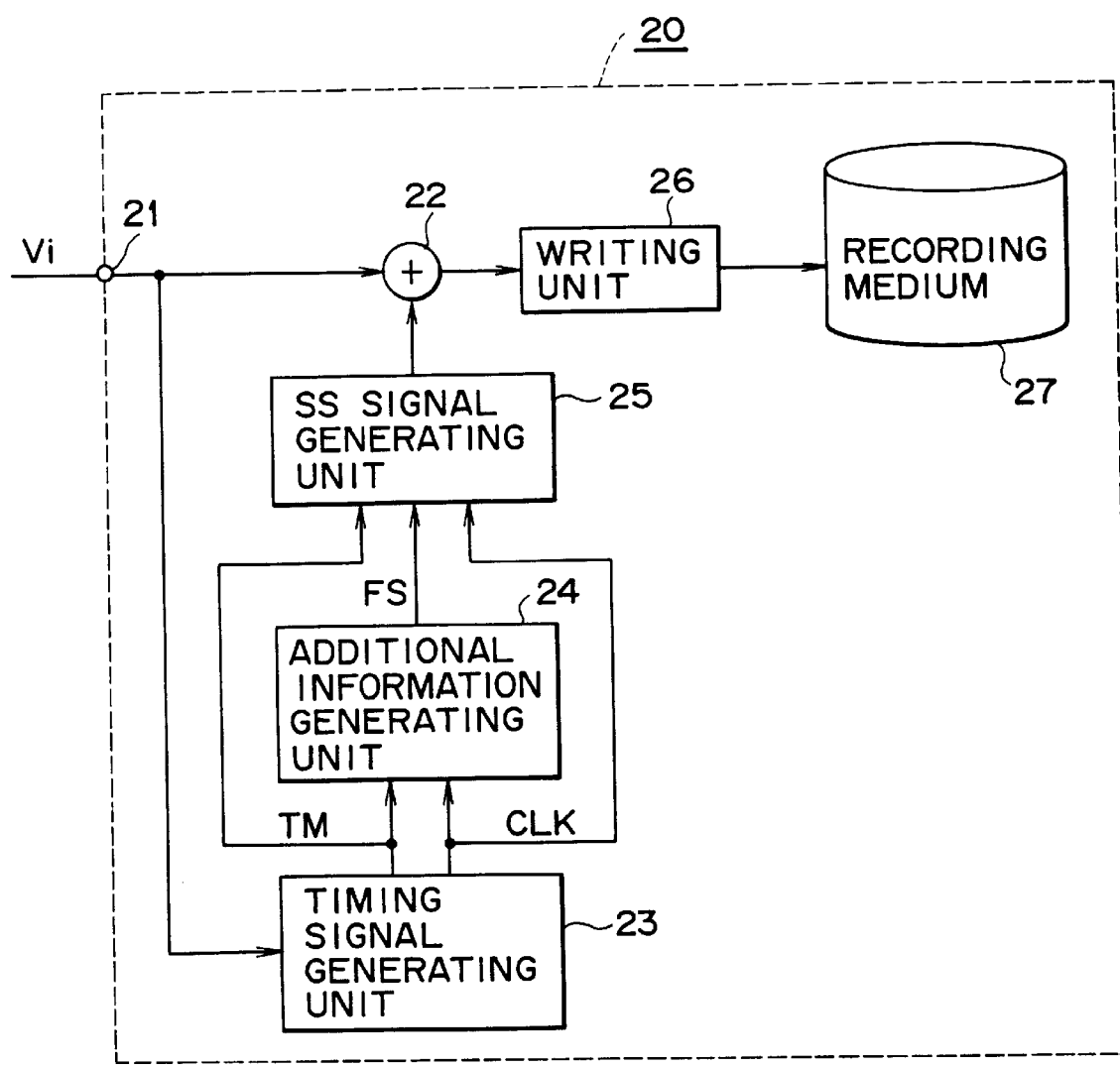
FIG. 2 is an explanatory view illustrating a recording system for superimposing a spectrum spread signal on a main information signal for recording.

FIG. 2 is a view showing an example of a recording apparatus for recording a video signal on a DVD disc, which is used by, for example, production companies and the like. A digital video signal Vi is inputted into this recording apparatus 20 through an input terminal 21.

The recording apparatus 20 comprises a superimposing unit 22, a timing signal generating unit 23, an additional information generating unit 24, a spectrum spread signal generating unit (hereinafter, abbreviated to SS signal generating unit), a writing unit 26, and a DVD disc 27 as a recording medium.

A digital video signal Vi from a playback device 10 is supplied to the superimposing unit 22 and the timing signal generating unit 23.

Figure 3:
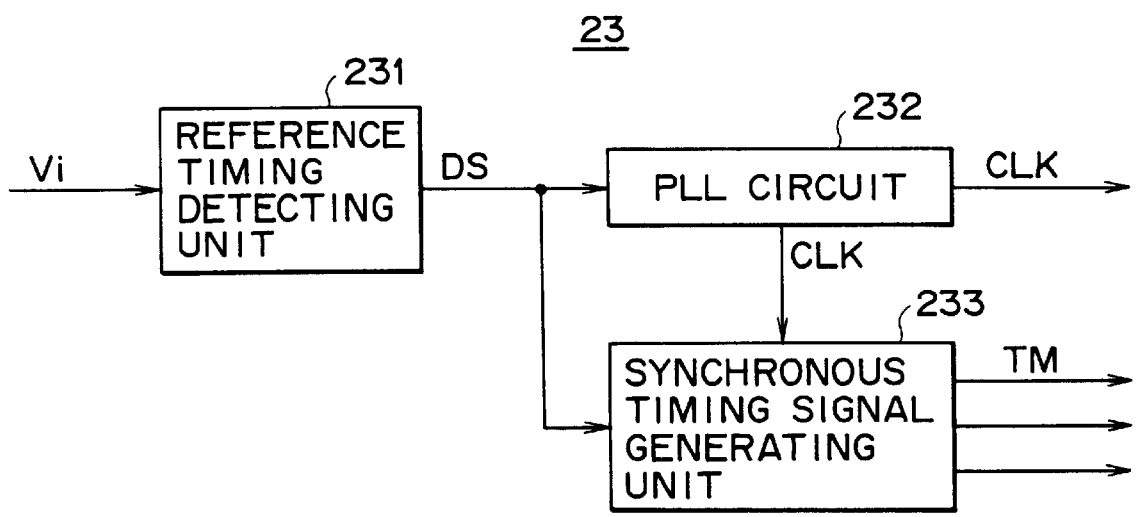
FIG. 3 is a block diagram showing a part of the system of FIG. 2.

The timing signal generating unit 23 generates a timing signal which synchronizes with the timing of a video synchronizing signal detected from the digital video signal Vi, and can be constituted, by comprising a reference timing detecting unit 231, a PLL circuit 232 and a synchronous timing signal generating unit 233 as shown in, for example, FIG. 3.

Figure 5:
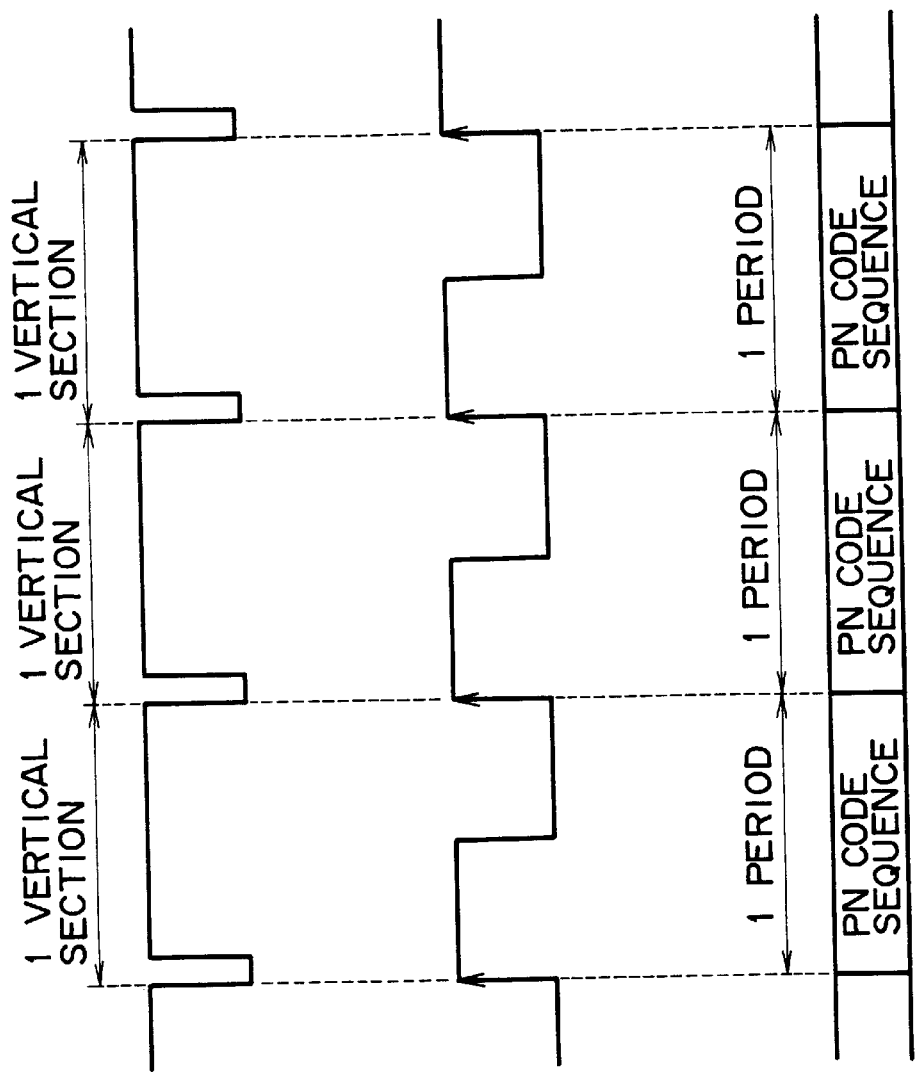
FIGS. 5A to 5C show a timing chart for spread synchronization of the recording system of FIG. 2.

The reference timing detecting unit 231 generates a video synchronous timing signal DS from the digital video signal Vi as a reference timing signal. In this embodiment, a vertical synchronizing signal VD is used as a reference timing signal, and the reference timing detecting unit 231 generates a signal DS showing timing of the vertical synchronizing signal VD (See FIG. 5A) from the digital video signal Vi, and supplies this signal to the PLL circuit 232 and the timing signal generating unit 233.

The PLL circuit 232 generates a clock signal CLK which synchronizes with the timing of the vertical synchronizing signal VD. This clock signal CLK is supplied to the timing signal generating unit 233, and is also supplied to the additional information generating unit 24 and the SS signal generating unit 25.

The timing signal generating unit 233 generates a spread synchronous timing signal TM (See FIG. 5B) on the basis of the signal DS and the clock signal CLK which synchronize with the timing of the vertical synchronizing signal VD, and supplies this spread synchronous timing signal TM to the additional information generating unit 24 and the SS signal generating unit 25. The timing signal generating unit 233 also generates other various necessary timing signals to supply them to the respective necessary portions.

The additional information generating unit 24 comprises a storage unit for storing an additional information signal FS to be superimposed on the video signal Vi, and the additional information signal FS is stored in this storage unit in advance.

As this additional information signal FS, there are taken as examples, control information such as duplication-preventive control, information relating to digital video signals such as, for example, time code information for distinguishing each field, and duplication-preventive signals such as copyright information, and the like. As the copyright information, an apparatus number for specifying, for example, the recording apparatus 30 in question is used. If this apparatus number is superimposed on the digital video signal Vi for recording, the history duplicated can be easily followed up. In this embodiment, such a duplication-preventive control signal as described above is used as the additional information signal FS, and for example, ROM, in which this duplication-preventive control signal has been stored, is provided at the additional information generating unit 24.

The additional information generating unit 24 generates a read signal in synchronization with a spread synchronous timing signal TM and a clock signal CLK which are supplied thereto, and outputs an additional information signal FS which is superimposed on the digital video signal Vi through this read signal to supply to the SS signal generating unit 25. In this case, the additional information signal FS is supplied to the SS signal generating unit 25 as an additional information signal sequence through the clock CLK.

The spread synchronous timing signal TM is a synchronous timing signal of the PN code sequence which is used for spectrum spread of the additional information signal FS, and this spread synchronous timing signal TM is generated as a signal which synchronizes with the vertical synchronizing signal VD and handles one vertical section as 1 period.

The SS signal generating unit 25 generates a PN (Pseudorandom Noise) code sequence as a spread code, and spectrum spreads an additional information signal FS from the additional information generating unit 24 using this PN code sequence.

Figure 4:
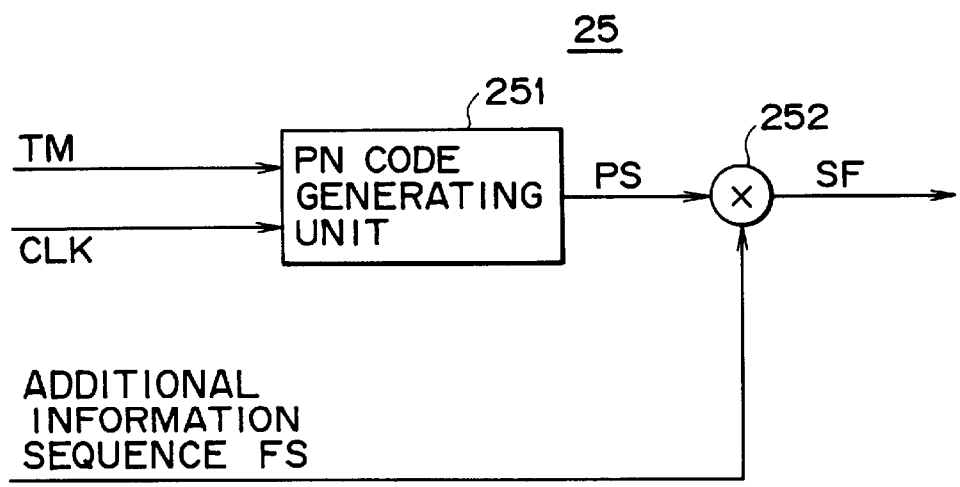
FIG. 4 is a block diagram showing a part of the system of FIG. 2.

FIG. 4 is a view showing a structural example of this SS signal generating unit 25. As shown in FIG. 4, the SS signal generating unit 25 comprises a PN code sequence generating unit 251 and an adder 252.

To the PN code sequence generating unit 251, there are supplied a clock signal CLK, an enable signal EN, and a spread synchronous timing signal (initialization signal) TM. The enable signal EN is a signal for enabling the PN code sequence generating unit 251, and is generated by turning on the recording apparatus 30 to be supplied to the PN code sequence generating unit 251.

The PN code sequence generating unit 251 is enabled in response to the enable signal EN. The PN code sequence generating unit 251 is reset through a spread synchronous timing signal TM, and generates the PN code sequence from its head. In this embodiment, it generates a PN code sequence PS (See FIG. 5C) in synchronization with the clock signal CLK.

Figure 6:
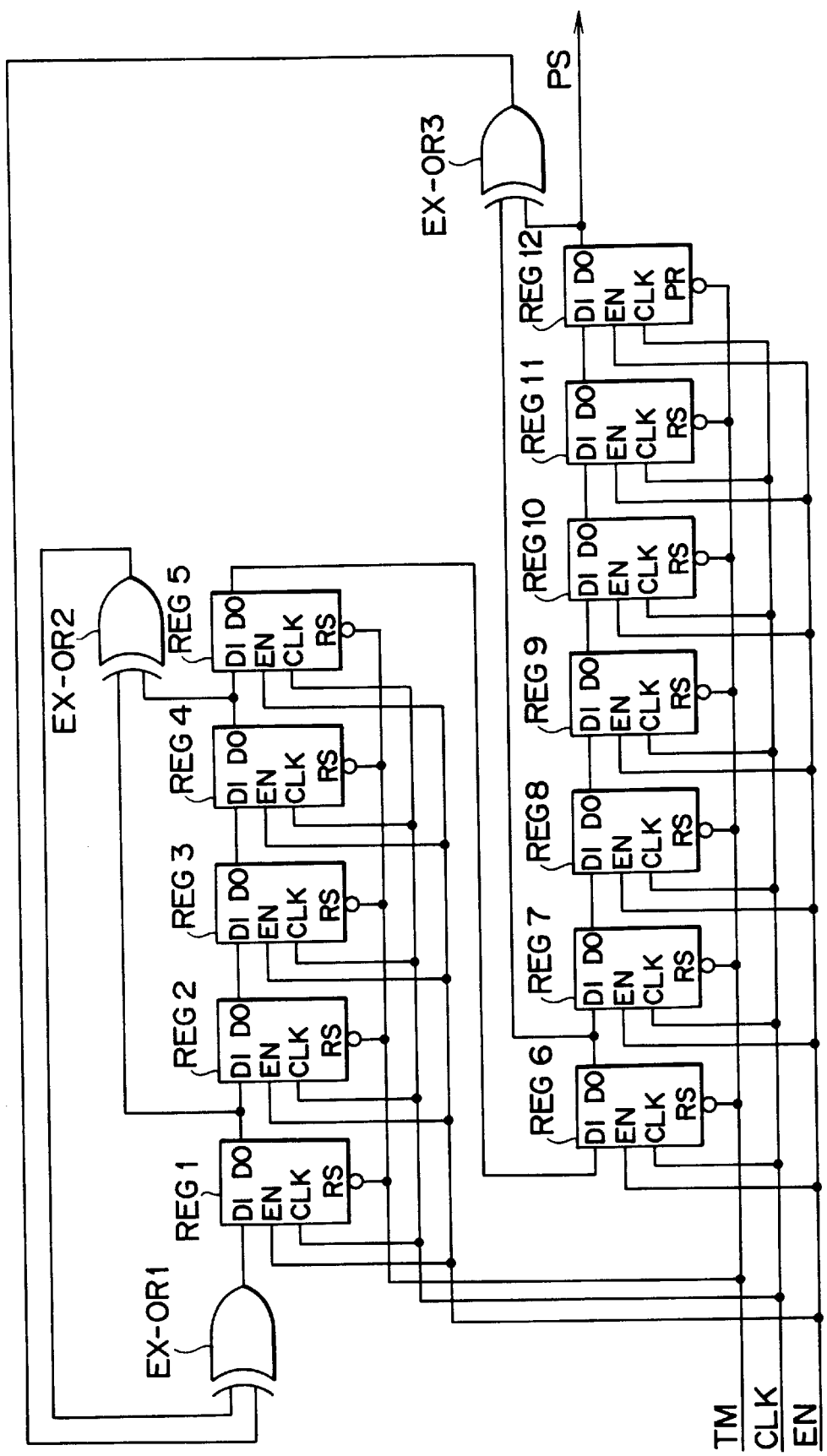
FIG. 6 is a view showing an example of a PN code generating unit.

FIG. 6 is a view showing a structural example for the PN code sequence generating unit 251. The PN code sequence generating unit 251 of this example comprises 12 pieces of D flip-flops REG1 to REG12 which constitute, for example, a 12-stage shift register, and exclusive OR circuits EX-OR1 to EX-OR3 for operating appropriate tap output of this shift register. The PN code sequence generating unit 251 shown in FIG. 6 generates, as described above, a PN code sequence PS of M-series on the basis of the spread synchronous timing signal TM, the clock signal CLK, and the enable signal EN.

The PN code sequence PS thus generated by the PN code sequence generating unit 251 is supplied to an adder 252. On the other hand, the additional information sequence FS from the additional information generating unit 24 is supplied to the adder 252.

The adder 252 spectrum spreads the additional information signal FS using the PN code sequence PS from the PN code sequence generating unit 251. From the adder 252, the spectrum spread signal SF, which is a signal obtained by spectrum spreading the additional information signal FS, is obtained.

Thus, the spectrum spread signal SF generated by the SS signal generating unit 25 is supplied to the superimposing unit 22. The superimposing unit 22 superimposes this spectrum spread signal on the digital video signal Vi to supply the digital video signal, on which this spectrum spread signal has been superimposed, to the writing unit 26.

After performing necessary processes such as compression encoding on the digital video signal, on which the spectrum spread signal from the superimposing unit 22 has been superimposed, the writing unit 26 records on the recording medium 27.

In this case, as described above, when the video signal is supplied to a monitor to display the image, the spectrum spread signal is superimposed on the digital video signal Vi at an infinitesimal level at which the image is not disturbed. For example, when one pixel is represented by eight bits, the spectrum spread signal is added to the least significant bit or the next bit of digital video signal of this 8-bit sample for superimposition.

Figure 7A:
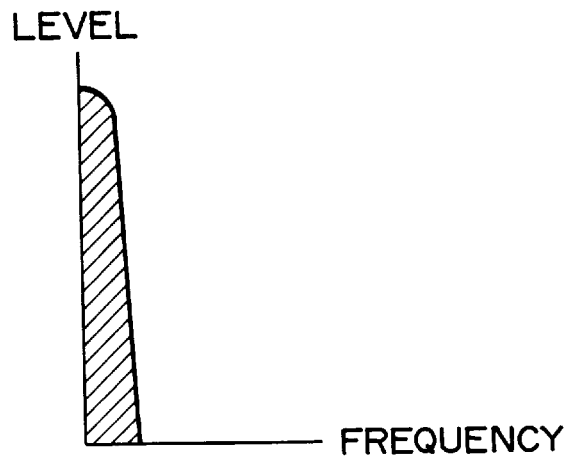
FIGS. 7A to 7D are explanatory views illustrating a spectrum spread of additional information on a main information signal.
Figure 7B:
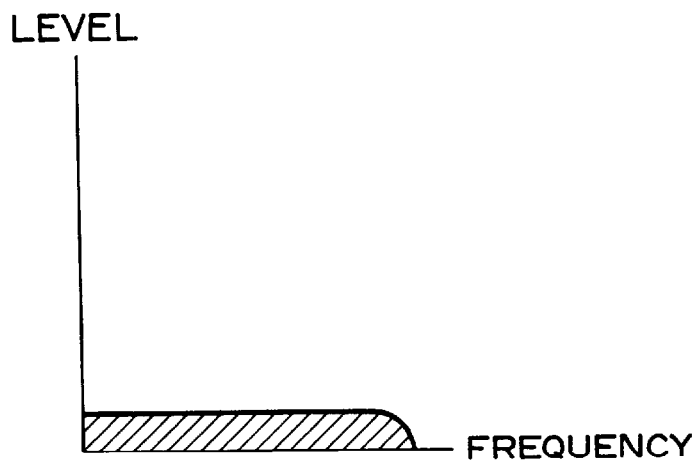

FIGS. 7A to 7D show the relationship between the spectrum spread signal and the video signal in spectrum. The additional information signal is a signal of a low bit rate having a small amount of information contained therein, and is a narrow-band signal as shown in FIG. 7A. When this signal is subjected to a spectrum spread, it becomes such a wide band signal as shown in FIG. 7B. At this time, the spectrum spread signal level becomes lower in inverse proportion to the enlargement ratio of the band width.

Figure 7C:
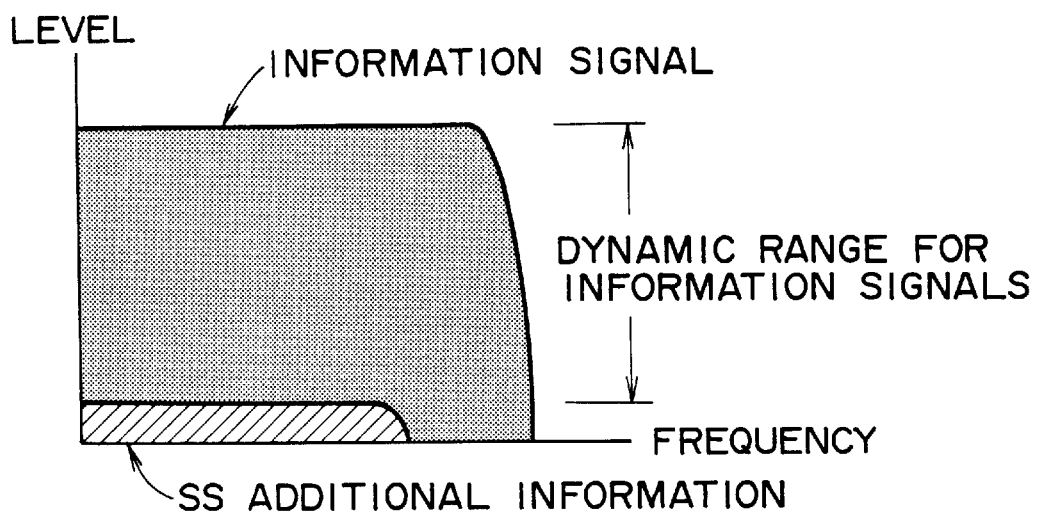

This spectrum spread signal is superimposed on a video signal by the superimposing unit 22. In this case, the spectrum spread signal is caused to be superimposed on a lower level than the dynamic range for a video signal as shown in FIG. 7C. By superimposing in this way, it is possible to almost prevent the video signal from being deteriorated. Accordingly, when a video signal, on which a spectrum spread signal is superimposed, is supplied to a monitor to play back the image, an excellent playback image can be obtained with almost no influence by the spectrum spread signal.

Figure 7D:
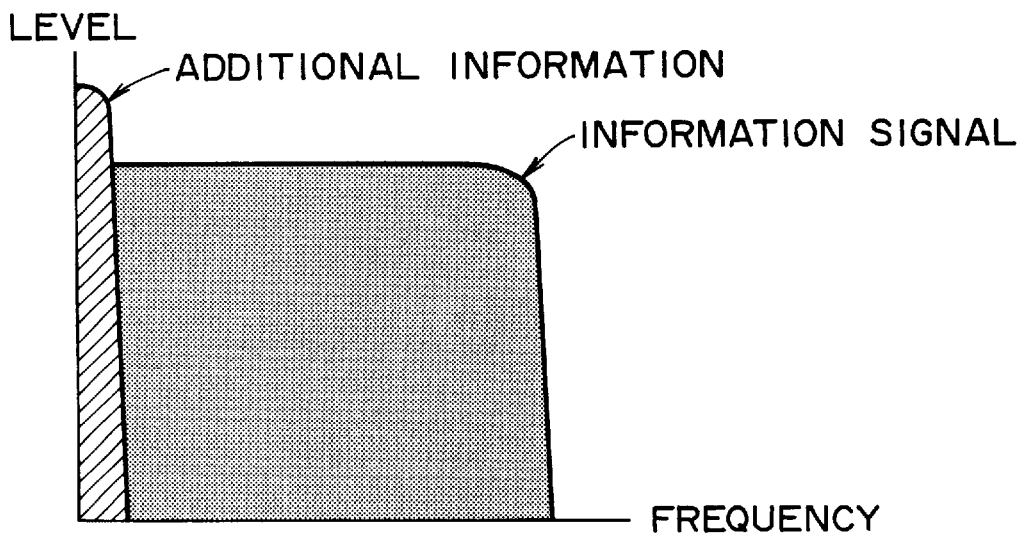

As described later, however, when the inverse spectrum spread is performed in order to detect the spectrum spread signal superimposed, the spectrum spread signal is restored as a narrow band signal again as shown in FIG. 7D. By providing a sufficient band width spread rate, the electric power of additional information signal after the inverse spread exceeds the information signal to enable detection.

In this case, since the additional information signal superimposed on a video signal is superimposed at the same time and within the same frequency as the video signal, it is impossible to delete and amend by using a frequency filter or replacing with simple information.

Therefore, by superimposing a necessary additional information signal on an information signal such as a video signal for recording, it is possible to reliably transmit the additional information signal in the wake of the video signal. Moreover, in case where an additional information signal which has been spectrum spread with lower signal power than information signals such as video signals is superimposed on an information signal as in the case of the above-described embodiment, it is possible to minimize the degradation of the information signal.

When as an additional information signal, for example, a duplication-preventive signal is superimposed on an information signal such as a video signal, it is difficult as described above to tamper or delete the duplication preventing signal, and therefore, duplication-preventive control capable of reliably preventing unauthorized duplication becomes possible.

Since in the above-described structure, the spectrum spread has been arranged to be performed using a PN code sequence of vertical period with the vertical synchronizing signal as a reference signal, a PN code sequence for inverse spectrum spread which becomes necessary in the case of detecting this spectrum spread signal from the digital video signal can be easily produced on the basis of a signal synchronized with the vertical synchronizing signal detected from the digital video signal Vi. In other words, synchronous control of the PN code for inverse spread using, for example, a sliding correlating device or the like becomes unnecessary. Since a PN code sequence for inverse spread can be thus easily generated, the inverse spectrum spread is quickly carried out, the spectrum is quickly spread and it is possible to detect an additional information signal such as a duplication-preventive control signal superimposed on the video signal.

FIG. 8 shows the structure of a duplication system for a digital video signal using a spectrum spread signal detecting apparatus according to the present invention, and this system comprises a playback apparatus 30 and a recording apparatus 40.

A digital video signal obtained from the playback of a recording medium 27 in the playback apparatus 30 is supplied to the recording apparatus 40. In this recording apparatus 40, the duplication-preventive control signal added to the digital video signal controls writing (recording) of a digital video signal onto a new recording medium 42.

In FIG. 8, in the recording medium 27, there is recorded, in this example, the digital video signal on which the duplication-preventive control signal as an additional information signal has been spectrum spread and superimposed as described above.

The information extracted from this recording medium 27 is restored to digital information by a read-out unit 31. In this case, if, for example, the information signal has been compression encoded and recorded, this read-out unit 31 decompression encodes the information signal, and the digital video signal Si restored is inputted into the recording apparatus 40.

In the recording apparatus 40, the digital video signal Si inputted thereto is supplied to a writing unit 41 and the spectrum spread signal detecting apparatus 50. In the spectrum spread signal detecting apparatus 50, the spectrum spread signal superimposed on the digital video signal Si is detected to restore the duplication-preventive control signal which is an additional information signal. Then, the duplication-preventive control signal restored is supplied to a write control unit 42.

The write control unit 42 generates a control signal S42 for controlling the writing unit 41 on the basis of the restored result of the duplication-preventive control signal to supply this signal to the writing unit 41. The control signal S42 controls permission or prohibition in writing the digital video signal on the recording medium 43.

When the control signal S42 from the write control unit 42 permits the duplication, the writing unit 41 performs a necessary process for recording the input digital video signal Si, for example, compression encoding to write it in the recording medium 43, while when the control signal S42 prohibits the duplication, the writing unit 41 controls the input digital video signal Si so as not to write it in the recording medium 43.

The spectrum spread signal detecting apparatus 50 comprises a level adjusting circuit 51, a spectrum spread additional information detecting unit (hereinafter, referred to as SS additional information detecting unit) 52, and a timing signal generating unit 53. In this respect, in the figure, SS stands for spectrum spread.

The level adjusting circuit 51 is used to reduce the change (variation) in level of the video signal as much as possible by controlling the gain of the video signal, which is a main information signal, without changing the gain of the spectrum spread signal, which is an additional information signal spectrum spread, as far as possible. In this respect, as described above, it is on the luminance signal component in the video signal that the spectrum spread signal is superimposed, and the level control by this level adjusting circuit 51 relates to the luminance signal level. A concrete structural example of the level adjusting circuit will be described later.

On receipt of a signal S51 subjected to gain control from the level adjusting circuit 51, the SS additional information detecting unit 52 performs an inverse spectrum spread process, and detects a duplication-preventive control signal S52, which is an additional information signal, for restoration to supply it to the write control unit 42.

In this case, the signal 51 becomes less correlated with the PN code, which is a spread signal, because it is gain controlled by a flat signal which hardly varies in signal level. Therefore, when the signal S51 is subjected to the inverse spread in the SS additional information detecting unit 52, the influence of the correlation between the video signal component and the PN code becomes less, and it becomes easier to detect the duplication-preventive control signal spectrum spread which is an additional information signal.

The timing signal generating unit 53 has quite the same structure as the timing signal generating unit 23 during recording shown in FIG. 2, and extracts a vertical synchronizing timing signal from the input digital video signal Si to generate a clock signal CLK and a production synchronous timing signal TM for the PN code on the basis of the vertical synchronizing timing signal. These clock signal CLK and synchronous timing signal TM are transmitted to the SS additional information detecting unit 52.

Figure 9:
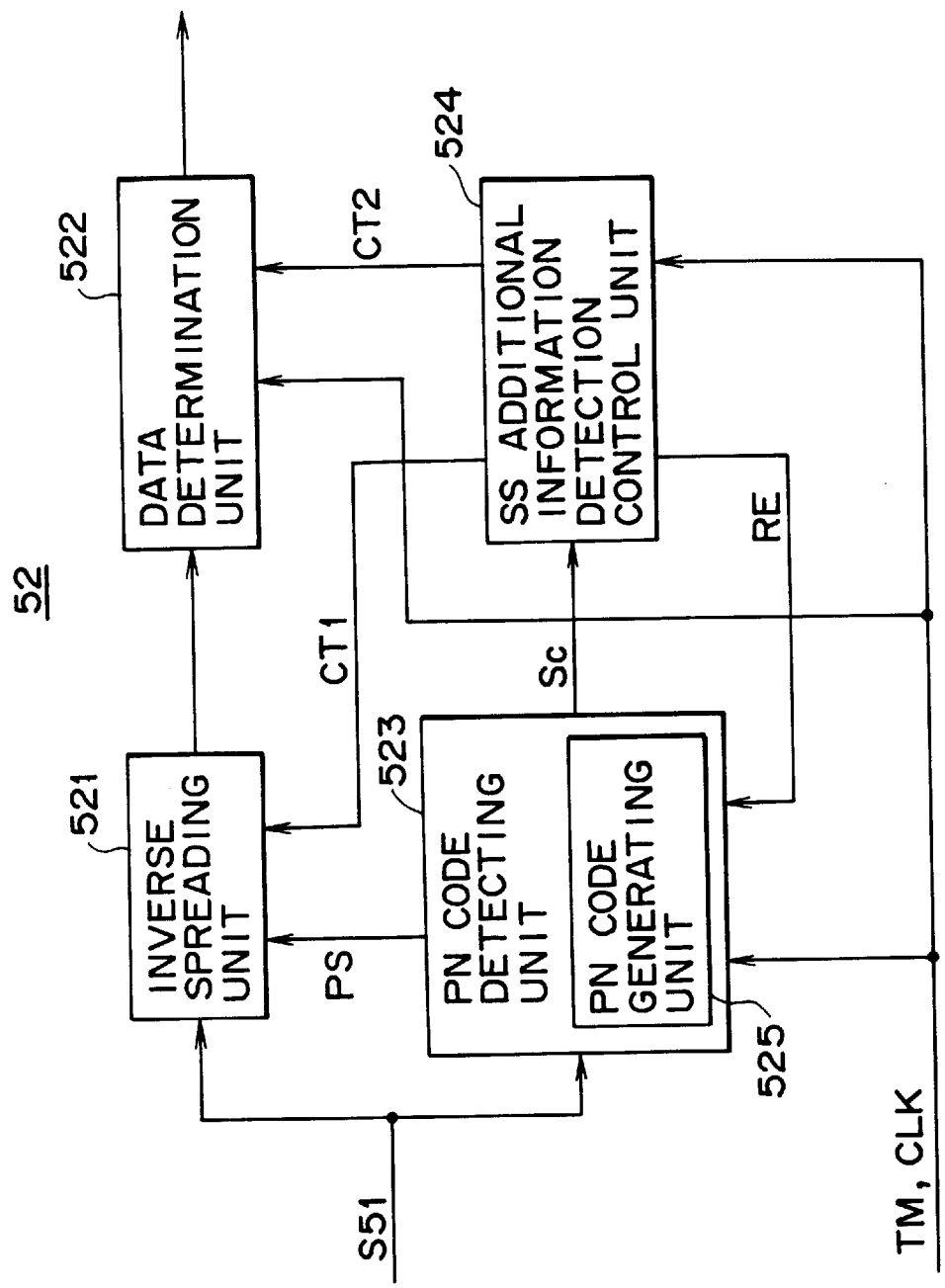
FIG. 9 is a view showing a structural example of a spectrum stead additional information detecting unit of the embodiment of FIG. 8.

FIG. 9 is a block diagram for explaining the structure of the SS additional information detecting unit 52 in the recording apparatus 40. As shown in FIG. 9, the SS additional information detecting unit 52 of this example comprises an inverse spread unit 521 for detecting a duplication-preventive control signal as an additional information signal which has been spectrum spread from the digital signal S51 supplied, a data determination unit 522 for restoring the duplication-preventive control signal detected by this inverse spread unit 521 to the original duplication-preventive control signal, a PN code detecting unit 523 for detecting a PN code which spectrum spreads the duplication-preventive control signal, and a spectrum spread additional information detection control unit (hereinafter, abbreviated to SS additional information detection control unit) 524.

As shown in FIG. 9, the PN code detecting unit 523 has a PN code generating unit 525. This PN code generating unit 525 has the same structure as the PN code generating unit 251 (FIG. 4) of the spectrum spread signal generating unit 25 of FIG. 2, and generates a PN code sequence PS. The SS additional information detection control unit 524 controls the occurrence timing of the PN code PS in the PN code generating unit 525.

More specifically, on receipt of a clock signal CLK and a synchronous timing signal TM supplied by the timing signal generating unit 53, the SS additional information detection control unit 524 forms a control signal such as a reset signal RE and an enable signal with respect to the PN code generating unit 525 to supply it to a PN code generating unit 525 in the PN code detecting unit 524. The PN code generating unit 525 is enabled through an enable signal, and generates a PN code sequence on the basis of the clock signal CLK at each timing corresponding to the reset signal RE.

The PN code detecting unit 523 determines a correlation between a PN code sequence generated by the PN code generating unit 525 and the input digital signal S51 to thereby detect the PN code sequence which spectrum spreads the duplication-preventive control signal.

The PN code detecting unit 523 supplies, to the SS additional information detection control unit 524, a signal Sc indicating the result obtained by determining the correlation between the PN code sequence generated therein and the PN code sequence which spectrum spreads the duplication-preventive control signal. As a result of determining the correlation between the PN code sequence generated in the PN code detecting unit 524 and the PN code sequence which spectrum spreads the duplication-preventive control signal as described above, this signal Sc becomes a high-level signal if the correlation is high, and a low-level signal if it is low.

If the signal Sc indicating the result obtained by determining the correlation from the PN code detecting unit 523 is a signal at a predetermined level or higher, the SS additional information detection control unit 524 judges that this is a state in which the PN code sequence which spectrum spreads the duplication-preventive control signal is in synchronization with the PN code sequence generated in the PN code generating unit 525, and that it detected the PN code sequence which spectrum spreads the duplication-preventive control signal. Conversely, if the signal Sc from the PN code detecting unit 523 is at a predetermined level or lower, the SS additional information detection control unit 524 judges that the PN code sequence which spectrum spreads the duplication-preventive control signal is not in synchronization with the PN code sequence generated in the PN code detecting unit.

When the PN code sequence which spectrum spreads the duplication-preventive control signal is not detected in the PN code detecting unit 523, the PN code detecting unit 523 adjusts the phase of the PN code sequence generated thereby under the control of a reset signal RE from the SS additional information detection control unit 524 to perform the correlation operation described above, and repeats the detection process of the PN code sequence.

When the PN code sequence which spectrum spreads the duplication-preventive control signal is detected in the PN code detecting unit 523, the SS additional information detection control unit 524 transmits a control signal CT1 to an inverse spread unit 521 in response to the detection result of the PN code detecting unit 523 to cause an inverse spectrum spread due to the PN code sequence PS from the PN code generating unit 525 to be carried out. Also, the SS additional information detection control unit 524 forms a signal CT2 for controlling the data determination unit 522 to supply this signal to the data determination unit 522.

The inversion spread unit 521 performs the inverse spectrum spread using the PN code sequence PS synchronously generated as described above to detect the duplication-preventive control signal made into a wide band signal at an infinitesimal level as the original narrow band signal at a high level from the input digital signal S51. The duplication-preventive control signal detected is supplied to the data determination unit 522.

The data determination unit 242 restores the duplication-preventive control signal detected to supply it to the write control unit 42. More specifically, it determines the content of the duplication control instructed by the duplication-preventive control signal to supply the determination result S52 to the write control unit 42.

Figure 10:
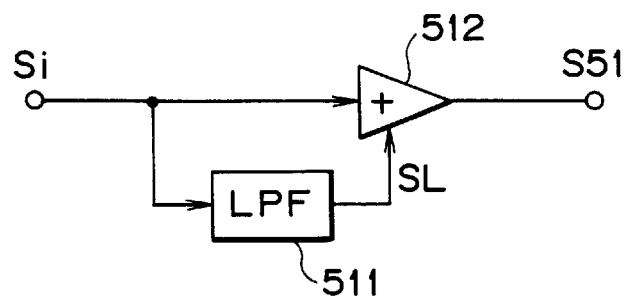
FIG. 10 is a view showing a first embodiment of a level adjusting circuit according to the embodiment of FIG. 8.

FIG. 10 shows a first embodiment of the level adjusting circuit 51. The level adjusting circuit according to the first embodiment comprises a low-pass filter 511 and a division operator 512. The low-pass filter 511 removes, as shown in FIG. 7C, the frequency component of the spectrum spread signal superimposed on the wide band to extract the low component of the video signal (luminance signal).

Figure 11A:
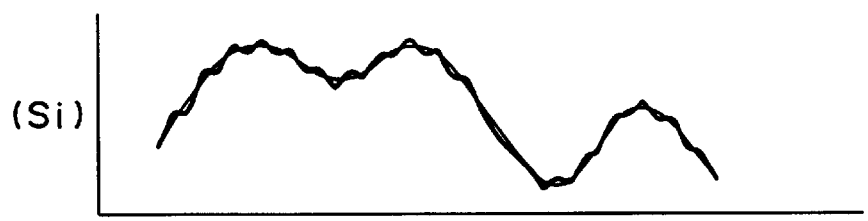
FIGS. 11A to 11C are explanatory views illustrating the operation in the embodiment of the level adjusting circuit of FIG. 10.
Figure 11B:
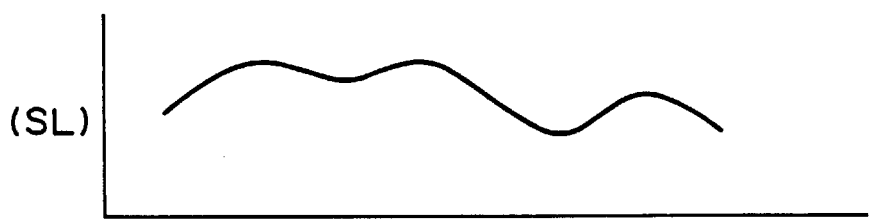

More specifically, if the input digital video signal Si is as shown in FIG. 11A, its low component SL as shown in FIG. 11B is obtained from the low pass filter 511. In this respect, the micro-signal component indicates the spectrum spread signal component in FIGS. 11A to 11C.

Figure 11C:
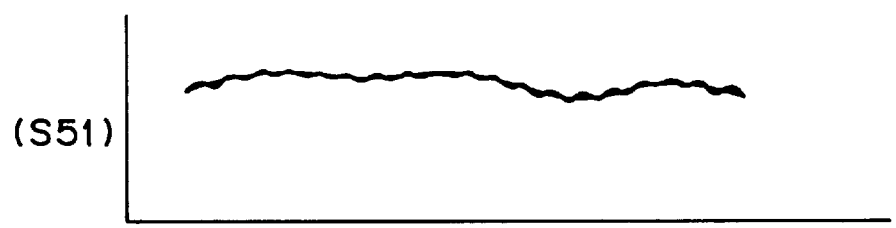

This low component SL is supplied to a division operator 512. The input digital video signal Si is also supplied to the division operator 512. From this division operator 512, a signal S51, which is gain controlled in a state in which the change of the original signal Si has been compressed, can be obtained as shown in FIG. 11C as the signal of an operation result of Si/SL.

The correlation between the signal S51 which has been gain controlled by such a flat signal which hardly varies in signal level, and the PN code, which is a spread code, becomes smaller.

Therefore, when the signal S51 is subjected to the inverse spread in the spectrum spread additional information detecting unit 52, it becomes easier to detect the duplication-preventive control signal spectrum spread which is additional information.

Figure 12:
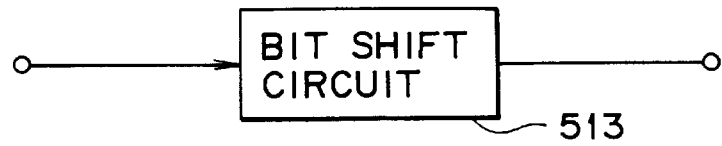
FIG. 12 is a view showing a second embodiment of a level adjusting circuit according to the embodiment of FIG. 8.

FIG. 12 shows a second embodiment of a level adjusting circuit 51, and the level adjusting circuit 51 of this example comprises a bit shift circuit 513. When the digit of the pixel sample data of the input digital video signal Si on the MSB side was "0", this bit shift circuit 513 is a circuit which bit shifts to the MSB side until MSB becomes "1".

Figure 13:
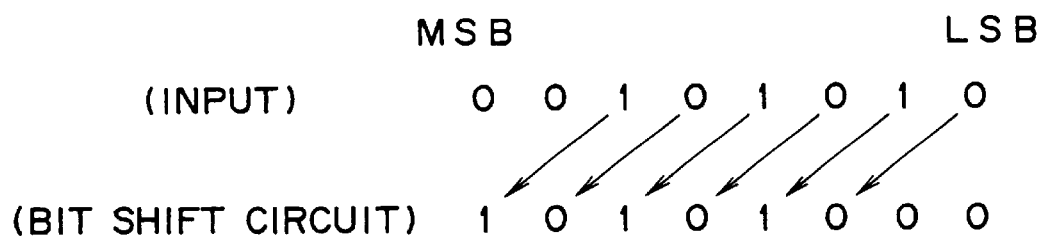
FIG. 13 is an explanatory view illustrating the operation in the embodiment of FIG. 12.

For example, in case where the digital video signal Si was a signal of 1 pixel sample/8 bits, when the sample data which has [00101010] from the MSB side as shown in FIG. 13 passes this bit shift circuit 513, it becomes [10101000], and the value shifts to a side of larger digital value. In other words, in this example, the digital value is to be multiplied.

As a result, for example, in case where the input digital signal Si is a digital signal of 8 bits/sample, the digital value varies with respect to the analog signal level as shown in FIG. 14A, and the signal S51 from the bit shift circuit 513 is leaning to the high level side as shown in FIG. 14B, and therefore, the change in level becomes smaller. In this respect, the micro-signal component indicates the spectrum spread signal component in FIGS. 14A and 14B.

Therefore, as in the above-described example, the signal S51, which has been gain controlled by a flat signal which hardly varies in level, becomes less correlated with the PN code, which is a spread signal. When this signal S51 is subjected to the inverse spread in the spectrum spread additional information detecting unit 52, it becomes easier to detect the duplication-preventive control signal spectrum spread which is an additional information signal. Moreover, this second embodiment has also a merit that gain control can be performed by a simple circuit configuration consisting of the bit shift circuit alone.

Figure 15:
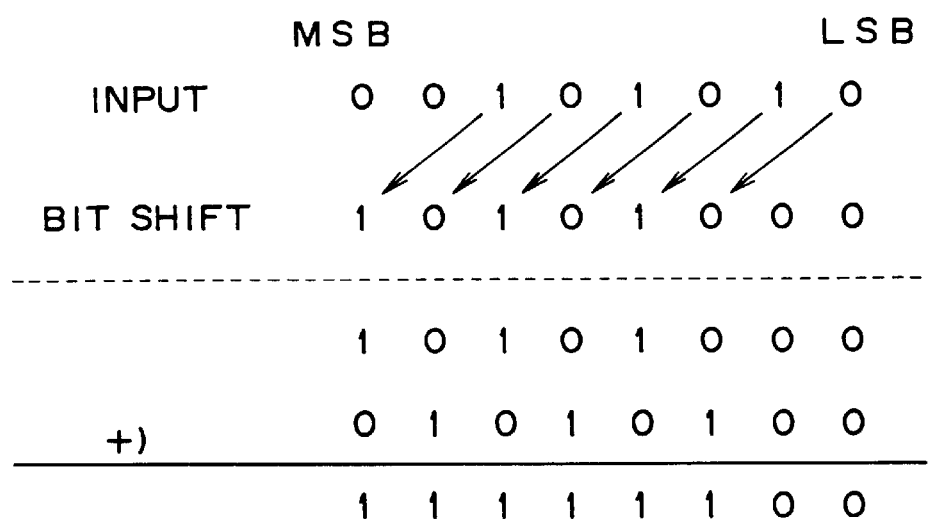
FIG. 15 is an explanatory view illustrating the operation in a variation of the embodiment of FIG. 12.
Figures 16A, 16B:
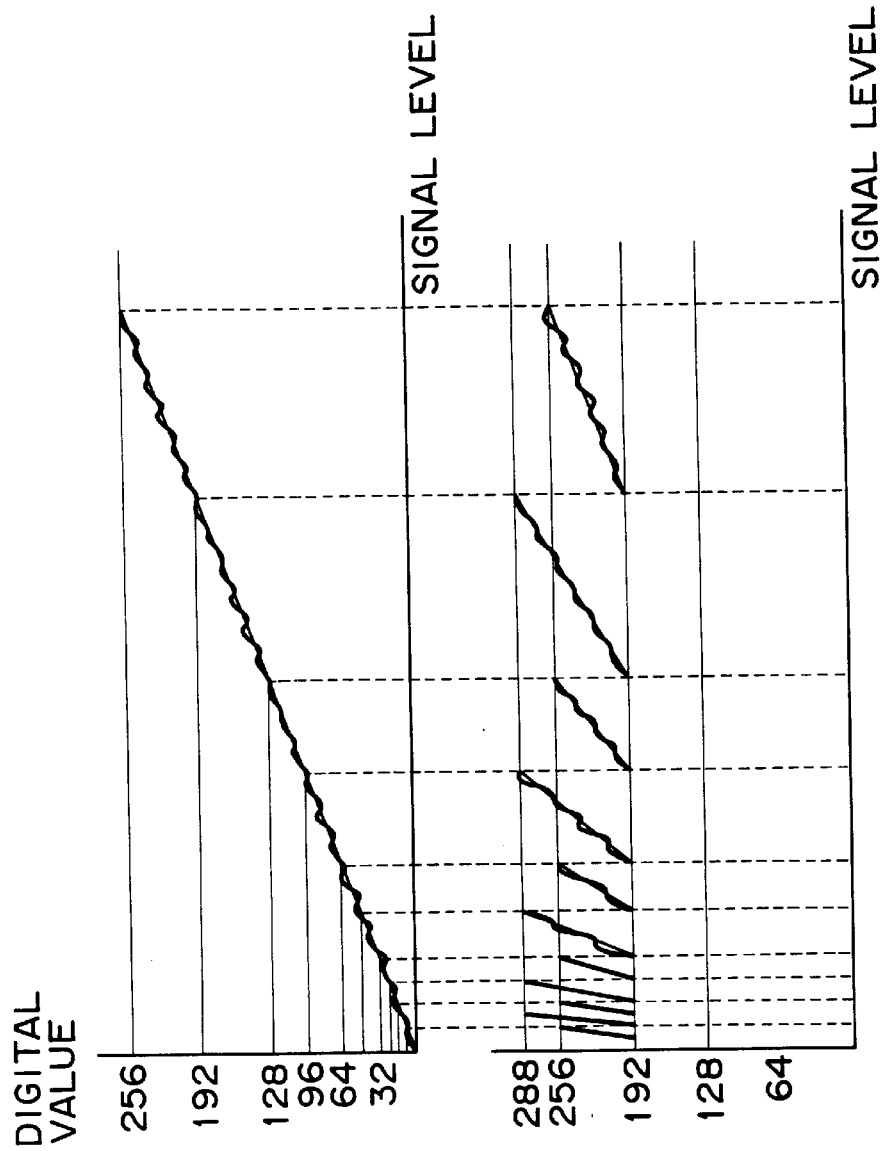
FIGS. 16A and 16B are explanatory views illustrating the operation in a variation of the embodiment of FIG. 12.

In this respect, when the second bit of the output from the bit shift circuit 513 from the MSB side is "0" as shown in FIG. 15, by the addition of a signal whose output has been shifted toward the LSB side by one bit, it is also possible to arrange to cause the digital signal value, which the digital video signal Si can take, to fall within a smaller range of change in level by further shifting such a signal as shown in FIG. 16A to the wider level side as shown in FIG. 16B.

In a third embodiment of an AGC circuit 51, a slicing circuit (not shown) is used as the AGC circuit. The slicing circuit 51 slices only multiple bits of an input digital signal Si, on which a spectrum spread signal has been superimposed, on the LSB (Least Significant Bit) side for fetching. When the input digital signal Si was, for example, a signal of 8 bits/sample, lower four bits are sliced for outputting.

Figure 18:
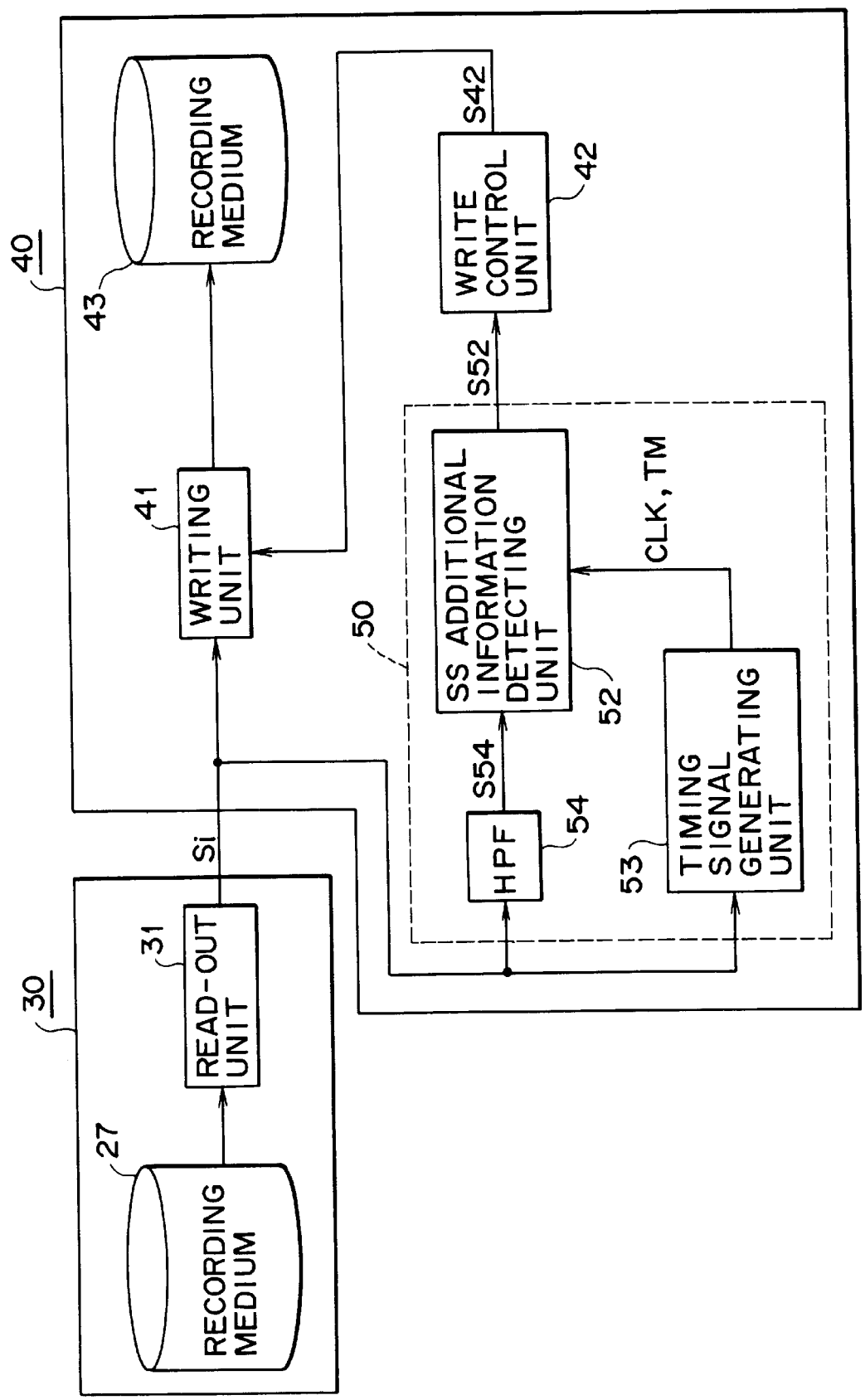
FIG. 18 is a block diagram showing another embodiment of a spectrum spread signal detecting apparatus according to the present invention.
Figure 19A:
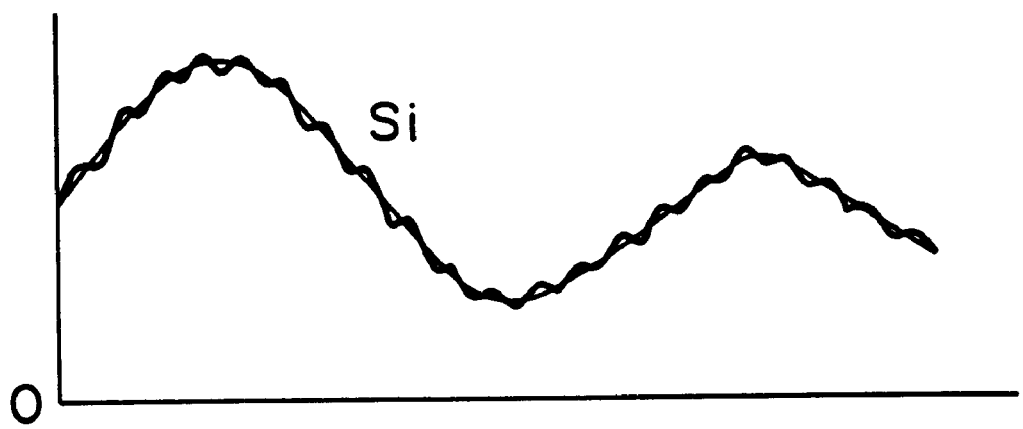
FIGS. 19A and 19B are explanatory views illustrating the embodiment of FIG. 17.
Figure 19B:
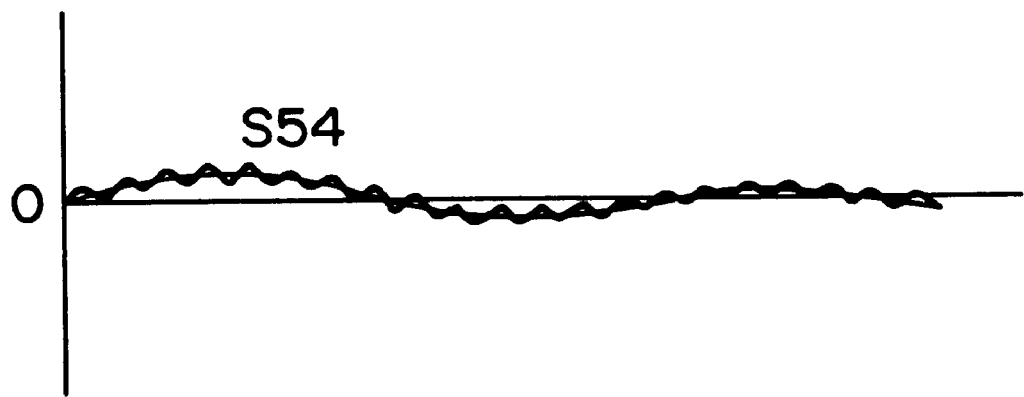

As a result, if it is, for example, a digital signal of 8 bits/sample, the input digital signal Si takes quantized values of "0" to "255" with respect to the analog signal level as shown in FIG. 18, while the signal S51 from the slicing circuit 51 becomes a signal having quantized values of "0"to "15"as shown in FIG. 8B. That is, the component of the video signal component, which is the main information signal, on the high level side is removed. Moreover, it becomes a signal whose change in level has been suppressed to be low as the main information signal. In this respect, the micro-signal component indicates the spectrum spread signal component in FIG. 18.

Accordingly, when the spectrum spread signal is inverse diffused, an unnecessary signal component is removed on detecting this spectrum spread signal. For this reason, the correlation component in the first term of the above-described evaluation equation (1) becomes small. Moreover, since the video signal as the main information signal becomes a signal whose change in level has been suppressed to be small by slicing, the correlation with the spread signal becomes less.

On receipt of a signal S51 from this slicing circuit 51, the SS additional information detecting unit 52 performs an inverse spectrum spread process, detects a duplication-preventive control signal S52, which is an additional information signal, for restoration, and supplies it to the write control unit 42.

Also in this case, the signal 51 has the high level component of the video signal component removed, and is a flat signal which hardly varies in signal level, and therefore, the correlation with the PN code, which is a spread code, becomes less as described above.

FIG. 17 is a block diagram showing another embodiment of a spectrum spread signal detecting apparatus according to the present invention.

In this embodiment, a spectrum spread signal detecting apparatus 50 comprises a high-pass filter 54, a timing signal generating unit 53 and a SS additional information detecting unit 52. In other words, this is quite the same as FIG. 1 except that the high-pass filter 54 is used in place of the level adjusting circuit 51 in the embodiment of FIG. 1.

In this case, the high-pass filter 54 is caused to have inverse characteristics to the low-pass filter 511 described above, that is, such characteristics that all the frequency components other than the component, which passes through the low-pass filter 511, are allowed to pass.

When the signal Si from the read-out unit 31 passes through the high-pass filter 54, it is supplied to the SS additional information detecting unit 52 with its low component removed. In other words, almost all the DC portions for light and dark of the video signal are to be removed. If the signal Si from the read-out unit 31 is, for example, such a signal whose waveform changes as shown in FIG. 18, the output S54 from the high-pass filter 54 becomes only a component with high fluctuating frequency with the low frequency portion including a DC content removed as shown in FIG. 18.

Accordingly, the output signal S54 from the high-pass filter 54 becomes a signal which hardly varies in level, and the correlation with the PN code sequence, which is a spread code, becomes less, and therefore, it becomes easier to detect the additional information spectrum spread.

In the foregoing, the description has been made of the example in which the main information signal is a video signal, but if the main information signal is a gain-controllable signal with a comparatively large range of fluctuations, the present invention is applicable thereto, and it goes without saying that audio signals and other information signals can also become the main information signal in the present invention.

Also, in the foregoing, the description has been made of the example in which the main information signal is a digital signal, but even if the main information signal is an analog signal, it can become the main information signal which is said in the present invention.

Also, the additional information is not limited to such a duplication-preventive control signal as described in the above-described examples, but any information can be used so long as it is the information which should be transmitted together with a main information signal such as copyright information and others, and which should not be easily lost.

Also, in the foregoing, the description has been made of the case in which a spectrum spread signal is detected from a playback signal from a disc on which an information signal, on which a spectrum spread signal has been superimposed, is recorded, but in the case of spectrum spreading additional information on a broadcasting signal such as ground wave broadcast, satellite broadcast or cable television broadcast for transmission, the present invention is applicable on detecting the spectrum spread signal from the broadcasting signal in question.

Also, as a spread signal for use in the spectrum spread, it is not limited to the PN code, but for example, gold code or other spread codes can be used.

As described above, according to the present invention, as regards a signal on which additional information spectrum spread has been superimposed, it is gain controlled so as to reduce the change therein, whereby it becomes easier to detect the spectrum spread signal. For this reason, it becomes easier to superimpose the spectrum spread signal on a main information signal at an infinitesimal level.

What is claimed is:

1. A method for detecting an additional information signal from an input signal formed by superimposing said additional information signal on a main information signal comprising the steps of:

generating a code identical with a code used for superimposing said additional information signal;

restraining a change in a level of said main information signal included in said input signal to produce a level restrained signal so that a correlation between said main information signal and said code is reduced, thereby improving the detection of said additional information signal; and detecting said additional information signal from said level restrained signal using said generated code, wherein said input signal is sliced and a signal at a predetermined level or lower is fetched from said input signal for generating said level restrained signal.

2. An apparatus for detecting an additional information signal from an input signal formed by superimposing said additional information signal on a main information signal, comprising:

means for generating a code identical with a code used for superimposing said additional information signal;

level restraining means for producing a level restrained signal by restraining a change in a level of said main information signal included in said input signal so that a correlation between said main information signal and said code is reduced, thereby improving the detection of said additional information signal; and detecting means for detecting said additional information signal from said level restrained signal using said generated code, wherein said level restraining means includes a gain control circuit for restraining a gain of said input signal to generate said level restrained signal, and said gain control circuit includes a filter for extracting said main information signal from said input signal, and an arithmetic circuit for dividing said input signal by an output signal from said filter.

3. An apparatus for detecting an additional information signal from an input signal formed by superimposing said additional information signal on a main information signal, comprising:

means for generating a code identical with a code used for superimposing said additional information signal;

level restraining means for producing a level restrained signal by restraining a change in a level of said main information signal included in said input signal so that a correlation between said main information signal and said code is reduced, thereby improving the detection of said additional information signal; and detecting means for detecting said additional information signal from said level restrained signal using said generated code, wherein said level restraining means includes a gain control circuit for restraining a gain of said input signal to generate said level restrained signal, and said input signal is a digital signal, and said gain control circuit has a bit shift circuit for bit shifting sample data for said input signal in a multiplying direction.

4. An apparatus for detecting an additional information signal from an input signal formed by superimposing said additional information signal on a main information signal, comprising:

means for generating a code identical with a code used for superimposing said additional information signal;

level restraining means for producing a level restrained signal by restraining a change in a level of said main information signal included in said input signal so that a correlation between said main information signal and said code is reduced, thereby improving the detection of said additional information signal; and detecting means for detecting said additional information signal from said level restrained signal using said generated code, wherein said level restraining means is a slicing circuit for slicing said input signal at a predetermined level and for fetching a signal at said predetermined level or lower.

5. A method for detecting an additional information signal from an input signal formed by superimposing said additional information signal on a main information signal comprising the steps of:

generating a code identical with a code used for superimposing said additional information signal;

restraining a change in a level of said main information signal included in said input signal to produce a level restrained signal so that a correlation between said main information signal and said code is reduced, thereby improving the detection of said additional information signal; and detecting said additional information signal from said level restrained signal using said generated code, wherein a gain of said input signal is restricted to generate said level restrained signal, and said step of restraining includes the steps of extracting said main information signal from said input signal and dividing said input signal by said extracted main information.

6. A method for detecting an additional information signal from an input signal formed by superimposing said additional information signal on a main information signal comprising the steps of:

generating a code identical with a code used for superimposing said additional information signal;

restraining a change in a level of said main information signal included in said input signal to produce a level restrained signal so that a correlation between said main information signal and said code is reduced, thereby improving the detection of said additional information signal; and detecting said additional information signal from said level restrained signal using said generated code, wherein a gain of said input signal is restricted to generate said level restrained signal, said input signal is a digital signal, and said gain of said input signal is restricted by bit shifting sample data of said input signal in a multiplying direction.

7. A method for detecting an additional information signal from an input signal formed by superimposing said additional information signal on a main information signal comprising the steps of:

generating a code identical with a code used for superimposing said additional information signal;

restraining a change in a level of said main information signal included in said input signal to produce a level restrained signal so that a correlation between said main information signal and said code is reduced, thereby improving the detection of said additional information signal; and detecting said additional information signal from said level restrained signal using said generated code, wherein a gain of said input signal is restricted to generate said level restrained signal, said input signal is a digital signal, said gain of said input signal is restricted by bit shifting sample data of said input signal in a multiplying direction, and said gain of said input signal is restricted by shifting said sample data of said input signal in a multiplying direction until the most significant bit is 1.

8. An apparatus for detecting an additional information signal from an input signal formed by superimposing said additional information signal on a main information signal, comprising:

means for generating a code identical with a code used for superimposing said additional information signal;

level restraining means for producing a level restrained signal by restraining a change in a level of said main information signal included in said input signal so that a correlation between said main information signal and said code is reduced, thereby improving the detection of said additional information signal; and detecting means for detecting said additional information signal from said level restrained signal using said generated code, wherein said level restraining means includes a gain control circuit for restraining a gain of said input signal to generate said level restrained signal, said input signal is a digital signal, said gain control circuit has a bit shift circuit for bit shifting sample data for said input signal in a multiplying direction, and said bit shift circuit shifts said sample data of said input signal in a multiplying direction until the most significant bit is 1.

9. A method for detecting an additional information signal from an input signal formed by superimposing said additional information signal on a main information signal, comprising the steps of:

generating a code identical with a code used for superimposing said additional information signal;

removing low frequency components of said input signal to produce a filtered signal so that a correlation between said main information signal and said code is reduced, thereby improving the detection of said additional information signal; and detecting said additional information signal from said filtered signal using said generated code.

10. An apparatus for detecting an additional information signal from an input signal formed by superimposing said additional information signal on a main information signal, comprising:

means for generating a code identical with a code used for superimposing said additional information signal;

means for removing low frequency components of said input signal to produce a filtered signal so that a correlation between said main information signal and said code is reduced, thereby improving the detection of said additional information signal; and means for detecting said additional information signal from said filtered signal using said generated code.

11. A method for detecting an additional information signal from an input signal formed by superimposing said additional information signal on a main information signal, comprising the steps of:

generating a code identical with a code used for superimposing said additional information signal;

removing high frequency components of said input signal to produce a filtered signal so that a correlation between said main information signal and said code is reduced, thereby improving the detection of said additional information signal; and modifying a gain of said input signal using said filtered signal to produce a modified signal by dividing said input signal by said filtered signal; and detecting said additional information signal from said modified signal using said generated code.

12. An apparatus for detecting an additional information signal from an input signal formed by superimposing said additional information signal on a main information signal, comprising:

means for generating a code identical with a code used for superimposing said additional information signal;

means for removing high frequency components of said input signal to produce a filtered signal so that a correlation between said main information signal and said code is reduced, thereby improving the detection of said additional information signal; and means for modifying a gain of said input signal using said filtered signal to produce a modified signal by dividing said input signal by said filtered signal; and means for detecting said additional information signal from said modified signal using said generated code.

* * * * *